US012586323B2

(12) United States Patent
Heitger

(10) Patent No.: US 12,586,323 B2
(45) Date of Patent: ***Mar. 24, 2026

(54) AUGMENTED PHOTO CAPTURE

(71) Applicant: PTC Inc., Boston, MA (US)

(72) Inventor: Jan Heitger, Munich (DE)

( * ) Notice: Subject to any disclaimer, the term of this patent is extended or adjusted under 35 U.S.C. 154(b) by 93 days.

This patent is subject to a terminal disclaimer.

(21) Appl. No.: 18/526,657

(22) Filed: Dec. 1, 2023

(65) Prior Publication Data

US 2024/0144619 A1      May 2, 2024

Related U.S. Application Data

(63) Continuation of application No. 17/617,031, filed as application No. PCT/EP2020/067175 on Jun. 19, 2020, now Pat. No. 11,836,873.

(30) Foreign Application Priority Data

Jun. 21, 2019    (DE) .......................... 102019116834.1

(51) Int. Cl.
| | |
|---|---|
| *G06T 19/00* | (2011.01) |
| *G06F 3/01* | (2006.01) |
| *G06F 3/03* | (2006.01) |
| *G06F 3/0346* | (2013.01) |
| *G06T 7/00* | (2017.01) |
(Continued)

(52) U.S. Cl.
CPC ............ *G06T 19/006* (2013.01); *G06F 3/011* (2013.01); *G06F 3/0304* (2013.01); *G06F 3/0346* (2013.01); *G06T 7/20* (2013.01); *G06T 7/70* (2017.01); *G06T 7/0002* (2013.01); *G06T 2207/30168* (2013.01)

(58) Field of Classification Search
CPC ....... G06T 19/006; G06T 7/0002; G06T 7/20; G06T 7/70; G06T 2207/30168; G06T 7/75; G06F 3/011; G06F 3/0346; G06F 3/0304
See application file for complete search history.

(56) References Cited

U.S. PATENT DOCUMENTS

| | | | |
|---|---|---|---|
| 8,818,093 B2 | 8/2014 | Ehlgen et al. | |
| 9,058,542 B2 | 6/2015 | Ehlgen et al. | |
(Continued)

OTHER PUBLICATIONS

International Search Report from PCT International Application No. PCT/EP2020/067175, dated Aug. 7, 2020.

*Primary Examiner* — Michael J Jansen, II
(74) *Attorney, Agent, or Firm* — Outside General Counsel, LLP; Alexander Franco

(57) ABSTRACT

A computer implemented method can include displaying, via a display of an augmented reality (AR) device, views of image data obtained by a camera of the AR device as the AR device is moved by a user; storing each view of a plurality of the displayed views in association with a respective visibility matrix comprising at least one visibility matrix element indicative of visibility of a target object within the each view; retrieving a respective visibility matrix for a plurality of the stored displayed views; selecting a plurality of the stored displayed views based on the retrieved visibility matrices; determining a displaying order of the selected views based on the retrieved visibility matrices; and displaying the selected views via the display of the AR device simultaneously or successively in the determined order.

17 Claims, 6 Drawing Sheets

(51) Int. Cl.
    *G06T 7/20*        (2017.01)
    *G06T 7/70*        (2017.01)

(56)            References Cited

U.S. PATENT DOCUMENTS

| | | |
|---|---|---|
| 10,169,915 B2 | 1/2019 | Teegan |
| 10,176,635 B2 | 1/2019 | Teegan |
| 10,186,084 B2 | 1/2019 | Tawara et al. |
| 10,365,784 B2 | 7/2019 | Inomata |
| 10,599,286 B2 | 3/2020 | Inomata |
| 10,685,496 B2 | 6/2020 | Teegan |
| 10,936,149 B2 | 3/2021 | Inomata |
| 11,030,784 B2 | 6/2021 | Kurz et al. |
| 11,836,873 B2 * | 12/2023 | Heitger ................. G06F 3/0304 |
| 2013/0039576 A1 | 2/2013 | Ehlgen et al. |
| 2013/0070966 A1 | 3/2013 | Ehlgen et al. |
| 2014/0002490 A1 | 1/2014 | Teegan |
| 2014/0368542 A1 | 12/2014 | Tawara et al. |
| 2015/0294507 A1 | 10/2015 | Teegan |
| 2017/0109916 A1 | 4/2017 | Kurz et al. |
| 2018/0341386 A1 | 11/2018 | Inomata |
| 2019/0079597 A1 | 3/2019 | Kada et al. |
| 2019/0087068 A1 | 3/2019 | Noguchi et al. |
| 2019/0122444 A1 | 4/2019 | Teegan |
| 2019/0196689 A1 | 6/2019 | Inomata |
| 2020/0159389 A1 | 5/2020 | Inomata |
| 2022/0343610 A1 | 10/2022 | Heitger |
| 2024/0144619 A1 * | 5/2024 | Heitger ................. G06F 3/0346 |

* cited by examiner

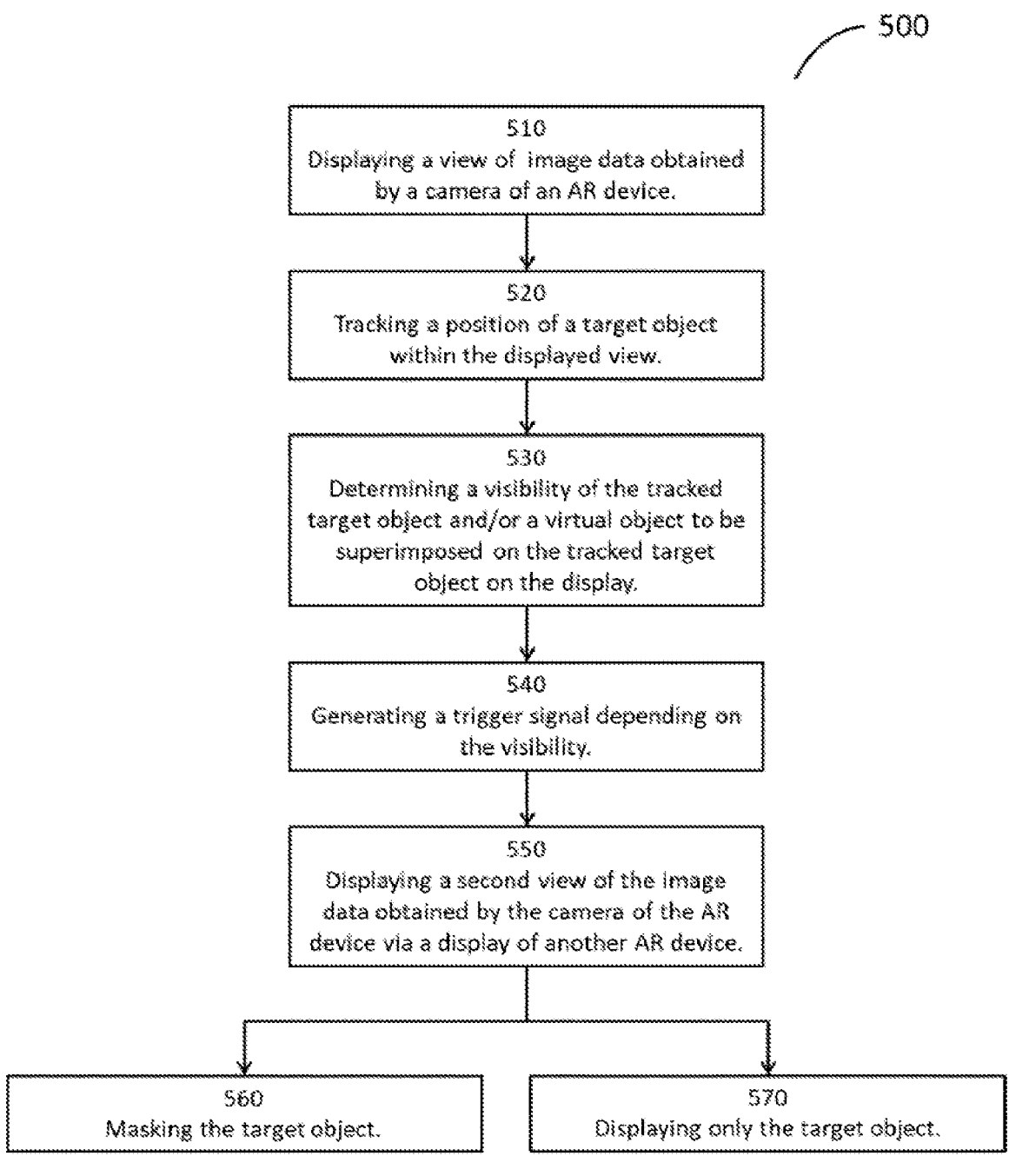

500

510
Displaying a view of image data obtained by a camera of an AR device.

520
Tracking a position of a target object within the displayed view.

530
Determining a visibility of the tracked target object and/or a virtual object to be superimposed on the tracked target object on the display.

540
Generating a trigger signal depending on the visibility.

550
Displaying a second view of the image data obtained by the camera of the AR device via a display of another AR device.

560
Masking the target object.

570
Displaying only the target object.

Figure 5

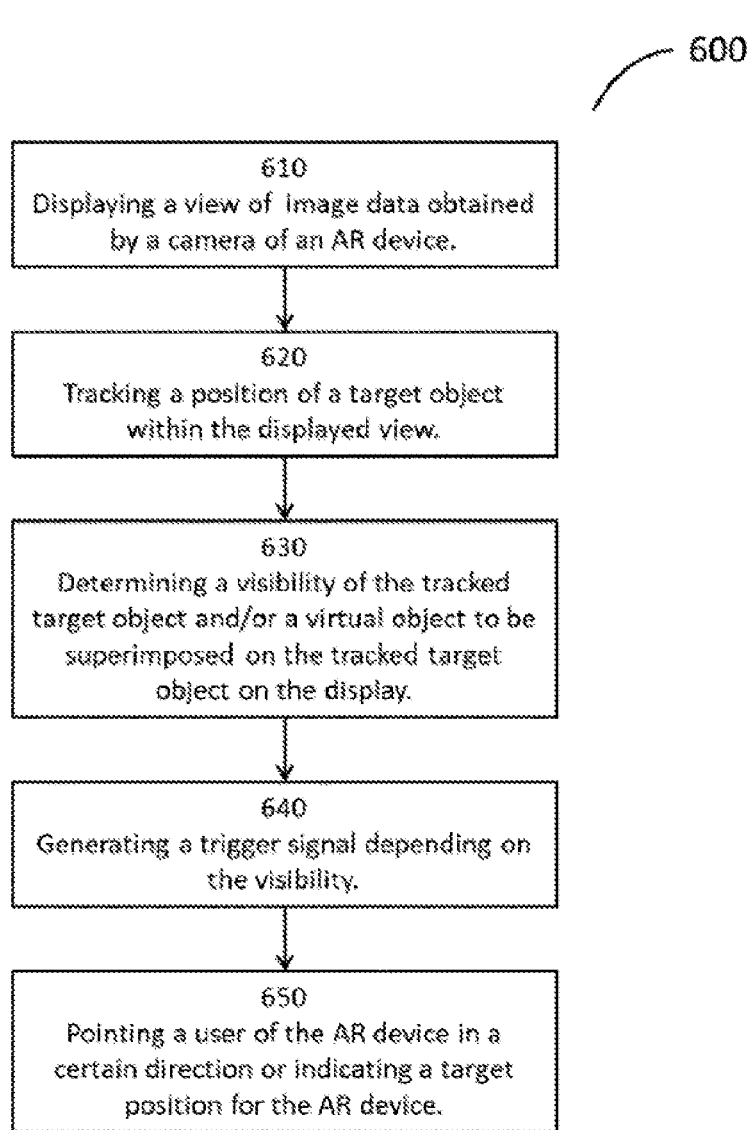

600

610
Displaying a view of image data obtained by a camera of an AR device.

620
Tracking a position of a target object within the displayed view.

630
Determining a visibility of the tracked target object and/or a virtual object to be superimposed on the tracked target object on the display.

640
Generating a trigger signal depending on the visibility.

650
Pointing a user of the AR device in a certain direction or indicating a target position for the AR device.

Figure 6

AUGMENTED PHOTO CAPTURE

CROSS-REFERENCE TO RELATED APPLICATIONS

This Application is a continuation of U.S. application Ser. No. 17/617,031, filed Dec. 7, 2021, now U.S. Pat. No. 11,836,873, which is a National Stage Application under 35 U.S.C. § 371 of PCT Application No. PCT/EP2020/067175, filed Jun. 19, 2020, which claims priority to German Patent Application No. 10 2019 116 834.1, filed Jun. 21, 2019, the entire contents of which are incorporated by reference herein.

BACKGROUND

Augmented photos have a particular use in industrial manufacturing processes. They may assist a user of an augmented reality (AR) device in performing certain manufacturing tasks, such as building, maintaining, repairing or inspecting a target device, such as a machine, a vehicle, or the like. To do so, the AR device displays a live view of the target device using a physical camera of the AR device. The AR device may be, for example, a handheld AR device, such as a smartphone a tablet, or a wearable device, such as AR glasses.

AR devices are known that are configured to superimpose the displayed live view of the target device with virtual objects that represent visualised information, thereby assisting the user in performing the manufacturing tasks. To do so, camera parameters, such as position, rotation and intrinsic parameters (e.g. an opening angle) of a virtual camera showing the virtual object are adjusted according to camera parameters of the physical camera showing the target device, such that the virtual object is adequately displayed within the displayed live view.

In order to allow the user to perform the manufacturing tasks whilst still having the required information displayed on the AR device, the user may take a screenshot of the live view and put the AR device aside. By putting the AR device aside, the user changes the position and rotation of the physical camera. However, the AR device continues to display the screenshot. In other words, after taking a screenshot, the displayed image is no longer updated according to the change in position and rotation of the physical camera. Likewise, parameters of the virtual camera remain unchanged such that the view of a virtual object superimposed on the screenshot is no longer updated according to the change in position or rotation of the AR device or the physical camera. The user can still see (different, i.e. interchangeable) virtual objects within the displayed screenshots. In other words, updating the camera parameters of the virtual camera is paused, while the virtual camera system remains active. Thereby, interaction of the user with virtual objects on the screenshot or exchange of virtual objects, either manually by the user automatically, is still possible. Hence, the user is provided with supplementary information on the displayed view of the target device without being required to hold the AR device in the hand.

However, a user of the AR device may not be aware of an optimal relative position between the AR device and the target device when taking a screenshot. The optimal relative position may depend on the position of one or more specific parts of the target device to be maintained or repaired and/or corresponding virtual objects to be superimposed on the displayed screenshot. This holds particular true if the user wants to take a plurality of screenshots corresponding to one or more manufacturing tasks. The user is thus required to either have detailed knowledge of the manufacturing tasks to be performed or take a high number of screenshots from different relative positions and relative angles between the AR device and the target device in order to ensure that the target device and/or the virtual objects to be superimposed can be adequately displayed by the AR device for each and every manufacturing task. This is, however, time consuming and represents an ineffective use of time, processing, storage and energy resources of the AR device.

From US 2017/109916 A1 is known a method of presenting a digital information related to a real object, comprising determining a real object, providing a plurality of presentation modes, wherein the plurality of presentation modes comprises an augmented reality mode, and at least one of a virtual reality mode and an audio mode, providing at least one representation of a digital information related to the real object, determining a spatial relationship between a camera and a reference coordinate system under consideration of an image captured by the camera, selecting a presentation mode from the plurality of presentation modes according to the spatial relationship, and presenting the at least one representation of the digital information using the selected presentation mode.

Hence, methods and systems are needed to improve efficiency of an AR device whilst improving user experience of the AR device for displaying physical objects and corresponding virtual objects, in particular when used to assist industrial manufacturing processes.

A method and systems according to the present invention solving the above-mentioned problem are defined by the independent claims. Advantageous embodiments of the invention are defined by the dependent claims.

SUMMARY

According to one of many embodiments, there is provided a computer implemented method comprising: displaying, via a display of an augmented reality, AR, device, a view of image data obtained by a camera of the AR device; tracking a position of a target object within the displayed view; determining a visibility of the tracked target object and/or a virtual object to be superimposed on the tracked target object on the display, wherein the position of the virtual object is dependent on the position of the target object; and generating a trigger signal depending on the visibility.

According to an embodiment, the trigger signal triggers a storing of the displayed view.

According to an embodiment, the trigger signal is configured to provide an indication to a user of the AR device to enable the user to store the displayed view.

The AR device for use in this method may assist a user of the device to perform repairing or maintaining tasks on a target object, such as a specific part of a machine, of a vehicle or the like that is within the field of view of the device camera. However, the user may be required to put the AR device aside depending on the task to be performed. At the same time, the target object and any superimposed virtual object(s) should be continued to be displayed in a way so as to assist the user in performing his task. For that purpose, an image of the displayed AR view is to be stored. The storing is to be performed either automatically or manually when the target object and/or the superimposed virtual objects are sufficiently visible. In other words, it is necessary that the target object is still visible to at least a certain degree when the image is stored.

The above defined method provides for an improved and continued assistance of a user of the AR device irrespective of the AR device's orientation. In other words, the user is enabled to place the AR device in a convenient position (e.g. on his lap, or on the ground next to him) while the AR device continues to display previously stored views of the target object and superimposed objects.

According to an embodiment, determining the visibility comprises determining an image quality of the displayed view, and/or determining what portion or part of the target object and/or a virtual object is visible within the displayed view.

A user of the AR device may perform movements relative to the target object to capture a plurality of images of the target object from different perspectives. However, due to the user's movement, undesired effects, such as motion blur, may occur within the displayed view. Such undesired effects may decrease the image quality of the displayed view and thus the visibility of the target object, which is indicated to the AR device or it's user by the generated trigger signal.

Also, a visibility of the target object may be determined to be sufficient and thus cause the trigger signal to be generated if a certain portion of the target is visible with the target view, e.g. a minimum percentage of the surface area of the target object, or if predetermined parts of the target object are visible, e.g. a part of a vehicle to be repaired.

According to an embodiment, the visibility is determined based on sensor data, in particular sensor data indicative of a position and/or a motion of the AR device and/or the target object.

Said sensor data may for example be obtained from an inertial measurement unit, IMU, of the AR device or the target object in order to determine whether the relative position or movement of the AR device to the target objects allows for capturing and displaying image data that fulfils previously defined image quality or visibility requirements.

According to an embodiment, the visibility is determined based on the tracked position of the target object.

That is, a target object or the virtual object to be superimposed on the target object situated in the proximity of the centre of the displayed view may have a relatively high visibility. Likewise, the determined position may indicate whether the target object or the virtual object is fully or partly concealed by other objects present in the displayed view. For example, the target object may be a part of a machine that is hidden by other parts of the machine, due to the relative position of the AR device (or the camera of the AR device) and the target object.

According to an embodiment, generating the trigger signal further comprises comparing the visibility of the displayed view with a previously determined visibility of a corresponding previously displayed view or previously stored displayed view.

In that manner, a relative visibility can be determined, i.e. an increased or decreased visibility of a target object on the displayed view relative to the visibility of the target object on the previously stored displayed view. Thereby, the trigger signal may be generated only if the determined relative visibility exceeds a predetermined threshold in order to avoid storing of displayed views that are too similar to each other.

According to an embodiment, the tracking of the position of the target object is based on previously obtained target object information.

The previously obtained target object information may comprise model information suitable for tracking the target object within the displayed view. That is, the previously obtained target object information may indicate which of the objects present in the displayed view represents the target object. In that manner, new target object information may be obtained in order to determine the position and visibility of a new target object, for example if a workflow associated with repair or maintenance task includes repairing or maintaining of more than one target object.

According to an embodiment, the method further comprises: storing the displayed view; and storing a visibility matrix associated with the stored displayed view, wherein the visibility matrix comprises at least one visibility matrix element indicative of the visibility of the target object.

The visibility matrix may include a plurality of elements, each of which is indicative of the visibility of the target object and associated with a respective different visibility criterion. For example, one matrix element may be associated with the visibility based on the tracked position of the target object, whereas another matrix element may be associated with the visibility based on the image quality of the displayed view, etc.

According to an embodiment, the method further comprises: retrieving a respective visibility matrix for one or more previously stored displayed views; selecting one or more of the stored displayed views based the retrieved visibility matrices; displaying the selected displayed views via the display of the AR device or another display of another AR device.

In that manner, the determined visibility of the tracked target object is used to present the "best" stored displayed view(s) to the user, i.e. the displayed view(s) that is (are) most suitable to assist the user in performing the repairing or maintenance tasks. The suitability, in turn, may be derived from a comparison of matrix elements of different visibility matrices.

According to an embodiment, the selected displayed views are displayed simultaneously and/or successively, the method further comprising: determining a displaying order based on the retrieved visibility matrices.

The visibility matrices may include matrix elements indicative of a relative position and/or orientation of the target object and the AR device within the stored displayed view. Thus, when repairing or maintenance tasks are performed on the target object, the method defined herein is suitable for providing a user of the AR device or the other AR device with appropriate augmented displayed views showing the target object from different angles.

The appropriate displayed views may further be displayed in an order corresponding to the relative position and/or orientation of the target object within the displayed view rather than corresponding to the storage time of the stored displayed views. In addition, different target objects may be presented to the user in an order corresponding to respective different subsequent steps in a repair or maintenance workflow.

According to an embodiment, the method further comprises: determining whether an orientation of the AR device is in a read mode position, in particular wherein the read mode position is a substantially horizontal position; wherein, in response to determining that the orientation is in the read mode position, the trigger signal triggers the displaying of the retrieved displayed views via the display of the AR device.

The determined visibility of the target object may indicate that the target object and/or the virtual object is/are not or not fully visible within the displayed view. If, in addition, the AR device is placed in a read mode, i.e. the AR device is rotated in a read mode position, one or more previously stored displayed views are presented on the display of the AR device that may be suitable to assist the user in performing the current repair or maintenance step.

According to an embodiment, the method further comprises: displaying a second view of the image data obtained by the camera of the AR device via a display of another AR device; wherein, within the displayed second view, the trigger signal triggers either a masking of the target object or a displaying of only the target object.

The user of the AR device may be supported by a user of another AR device when performing repair or maintenance tasks. The view displayed on the AR device may, however, show confidential objects, e.g., objects in a research environment presenting unpublished information. The user of the AR device may thus want to hide such confidential objects from the user of the other AR device. This may be achieved by either defining a confidential object as the target object and masking the target object or, inversely, defining the surrounding of the confidential object as the target object and then displaying only the target object.

According to an embodiment, the trigger signal is configured to provide an indication to point a user of the AR device in a certain direction or to indicate a target position for the AR device.

The determined visibility may comprise the position and/or the orientation of the target object within the displayed view. Using the determined visibility, the AR device enables the user to move in a certain direction or to move the AR device in a certain direction or towards a target position, in order to achieve an increased visibility by optimizing the position and the orientation of the AR device and the target object relative to each other.

As another aspect, the AR device may determine, based on the determined visibility, that the AR device, more precisely the camera of the AR device, is positioned in a danger zone. The danger zone may be previously defined and may comprise (changing) areas around defined by or relative to (approaching) dangerous objects.

There is provided an augmented reality device comprising means for carrying out the method of any of the embodiments described above.

There is provided a computer program comprising instructions which, when the program is executed by an augmented reality device, cause the augmented reality device to carry out the method of any of the embodiments described above.

There is provided a computer-readable storage medium comprising instructions which, when executed by an augmented reality device, cause the augmented reality device to carry out the method of any of the embodiments described above.

BRIEF DESCRIPTION OF THE DRAWING

The present invention may be better understood from reading the following description of non-limiting embodiments, with reference to the attached drawings, wherein:

FIG. 5 shows a flowchart of a third computer implemented method; and

FIG. 6 shows a flowchart of a fourth computer implemented method.

DETAILED DESCRIPTION OF THE PREFERRED EMBODIMENTS

Figure 1:
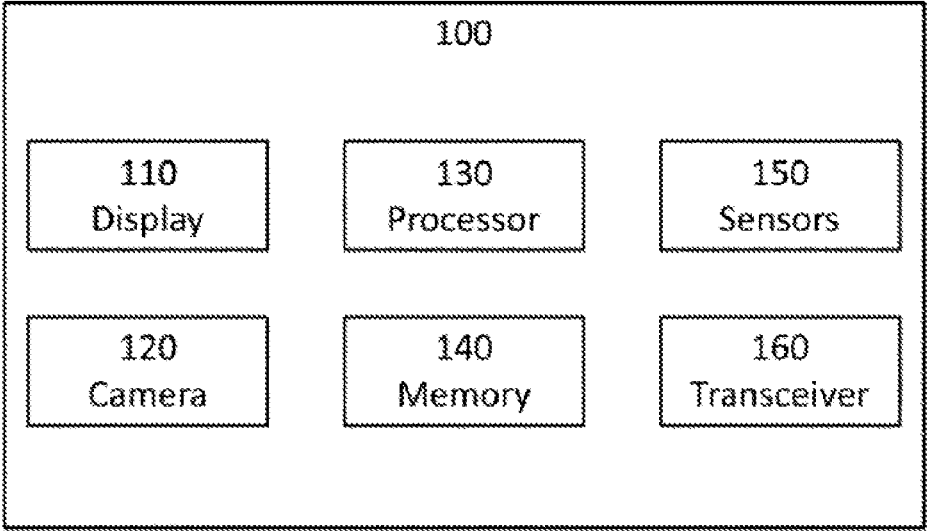
FIG. 1 shows an augmented reality (AR) device comprising means for carrying out methods according to the present invention.

FIG. 1 shows an augmented reality (AR) device 100 comprising means for carrying out methods described below. In particular, AR device 100 comprises a display module 110, a camera module 120, a processor module 130, a memory or storage module 140, a sensor module 150 and a transceiver module 160.

Figure 2:
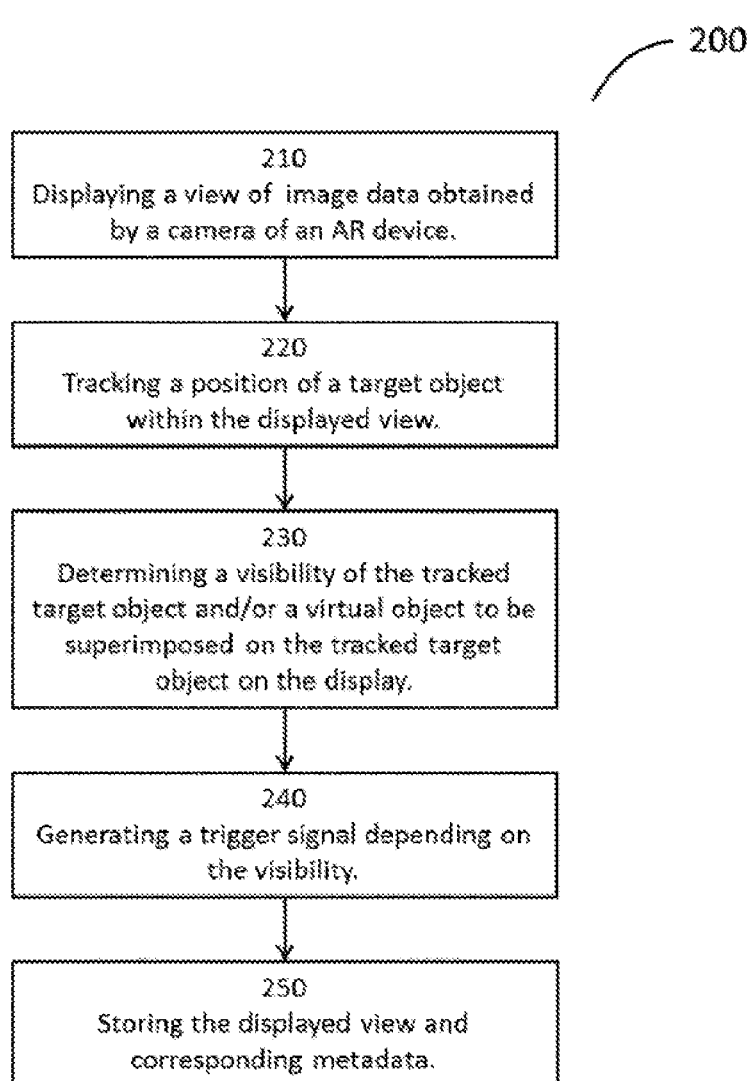
FIG. 2 shows a flowchart of a first computer implemented method.

FIG. 2 shows a flowchart of a first computer implemented method 200. As for all flowcharts of methods described herein below, the individual method steps of method 200 can be performed in a different order. Moreover, the methods may comprise more or fewer method steps as described with reference to the corresponding flowchart. The method steps of the methods described herein below may be performed on an AR device or at a server.

The method 200 starts at step 210 with displaying, via a display of an AR device, a view of image data obtained by a camera of the AR device. The AR device may be, for example, a handheld device or a wearable device. A user of the device may move around with the device, thereby capturing different image data, a respective view of which is displayed via the display of the AR device.

The user may point the camera of the AR device in direction of a target object, such that the displayed image data captured by the camera shows the target object. The target object may be an object to be maintained or repaired by the user of the AR device. The target object may, for example, be a vehicle or a specific part of the vehicle.

The position of the target object within the displayed view is tracked in step 220. Tracking the target object within the displayed view may comprise identifying the target object and determining, in particular repeatedly determining the position and/or orientation of the target object within the displayed view. Tracking the target object may further comprise determining whether or not the target object is shown within the displayed view and/or determining what part of the target object is shown within the displayed view. Tracking the position and/or orientation of the target object within the displayed view may be based on previously stored target object information, such as model information, in particular 3D model information of the target object.

Tracking the position and/or orientation of the target object within the displayed view may further be based on pattern or object recognition techniques performed by a processor of the AR device, such as processor 130, and/or on sensor data retrieved from sensors of the AR device and/or the target object, the sensor data indicating a relative position of the AR device and/or the target object. The sensor data may be retrieved via a transceiver of the AR device, such as transceiver 160, or may be generated by sensors of the AR device, such as sensors 150.

Subsequently or simultaneously, a visibility of the tracked target object and/or a virtual object to be superimposed on the tracked target object on the display is determined in step 230, for example, by the processor of the AR device. The visibility may be determined based on one or more different visibility factors or circumstances described in more detail below. The visibility may be quantitatively determined as a visibility value, a visibility vector, or more generally, a visibility matrix.

In step 240, a trigger signal is generated depending on the visibility. That is, a trigger signal may be generated if a function of the one or more visibility values of the visibility matrix fulfils a predetermined visibility requirement, e.g. if the determined visibility exceeds a predetermined threshold, in particular if certain visibility values of the visibility matrix exceed a corresponding threshold.

The trigger signal may directly trigger the storing of the displayed view, or may provide an indication to a user of the AR device to enable the user to store the displayed view. Hence, subsequent to generating a trigger signal, in step 250, the displayed view is stored in a memory module of the AR device, such as memory 140. Storing the displayed view may comprise storing metadata corresponding to the stored displayed view. The displayed view may be stored as part of an augmented photo, the augmented photo comprising the displayed view and the corresponding metadata.

The visibility matrix may comprise a plurality of visibility values. Each of the visibility values within the visibility matrix may be weighted with a respective weighting coefficient. The weighting coefficients may be predetermined or may be a function of one or more visibility values. Each of the visibility values may depend on one or more visibility factors or circumstances:

a) Dependence of the visibility on position and orientation of the target object and/or the virtual object within the displayed view: The AR device may determine whether or not the target object is visible within the displayed view, comprising whether or not the target object is partly visible within displayed view, in particular what part of the target object is visible. Likewise, the AR device may determine, depending on the tracked position of the target object within the displayed view, whether or not the virtual object or a specific part of the virtual object is visible within the displayed view when superimposed on the tracked target object on the display. Furthermore, the visibility of the target object and/or the virtual object may depend on the position and/or orientation of the respective target object or virtual object within the displayed view. In particular, the visibility may be determined based on a relative position of the target object and/or the virtual object within the displayed view, wherein the relative position may be determined with respect to a reference position on the display, such as the centre of the display.

b) Dependence of the visibility on image quality of the displayed view: The visibility may further depend on a determined image quality of the displayed view. The image quality may be determined based on an analysis of the captured image data. The image quality may further depend on the position or movement of the AR device relative to the target object. For example, motion blur may occur due to a high velocity of the relative movement. The movement of the AR device relative to the target object may be determined based on sensor data of position and/or movement determination sensor modules of the AR device, such as a global positioning system (GPS) or an inertial measurement unit (IMU). Additionally, or alternatively, said sensor data may be indicative of the position or movement of the target object, generated by a sensor module of the target object and received by a transceiver module of the AR device.

c) Dependence of the visibility on visibility values of previously captured and/or stored displayed views: The visibility matrix may further depend on the visibility of the target object within a previously displayed view. In other words, the visibility matrix may comprise a relative visibility. That is, the AR device may compare current visibility values corresponding to a currently displayed view with previous visibility values corresponding to a previously displayed view, in particular to a previously stored displayed view. The AR device may thereby determine whether the target object within the current displayed view has a higher visibility than a previously displayed or stored view, or is too similar to a previously displayed or stored view. For example, a previously stored displayed view may be too similar to a currently displayed view if position and/or orientation of the target object and/or a virtual object within the respective displayed view are too similar. In other words, a current displayed view may be too similar to a previously displayed or stored view if the difference, in particular an absolute value of the difference between current and previous visibility values, is below a corresponding threshold.

d) Dependence of the visibility on target object information: The visibility may be based on previously received and/or stored target object information. The target object information may be indicative of a predetermined step or sequence of steps to be performed by the user of the AR device, wherein the sequence of steps may comprise one or more different target objects, in particular different target object positions. For example, the target object information may be indicative of different maintaining or repairing steps to be performed by the user of the AR device. Based on the predetermined sequence of steps, the AR device may determine different, e.g. subsequent target objects and may determine the visibility of one of the target objects within the displayed view based on the visibility of other target objects.

According to an example, one of the steps to be performed by the user of the AR device may be maintaining or repairing a first target object hidden by a second target object. The sequence of steps may thus comprise removing the second target object and, subsequently, manipulating the first target object. The AR device, being aware of the sequence of steps, may determine the visibility of the second target object depending on the position of the first target object hidden behind the second target object, such that the relative position of the AR device and the target may remain substantially the same when capturing and storing displayed views showing the first and second target objects, respectively. Thus, a sequence of displayed views may be presented to a user in an intuitive manner according to different steps to be performed by the user.

According to another example, it may be determined based on data received from a sensor module of the target object that a maintaining or repairing step has been performed on the target object. In response thereto, the completion of said maintaining or repairing steps may be determined. The AR device may then define the maintained or repaired target object as a new target object of which new displayed views may be captured and stored. The maintaining or repairing status of the target object may be stored as metadata of the corresponding stored displayed view. The visibility of the maintained or repaired target object may additionally depend on a comparison of the displayed view with previously stored reference data, i.e. target object information of the maintained or repaired target object, indicative of a desired target object or a desired displayed view of the target object, in order to enable the AR device to evaluate the performed maintaining or repairing step.

According to yet another example, the sequence of steps may comprise performing manufacturing tasks on different portions of the target object or on different target objects of a device. The visibility of the target object and/or a virtual object may thus depend on a determination whether one or more or a certain number of displayed views or screenshots are necessary to adequately show each of the portions of the target object or each of the different target objects.

Referring again to step 250 of method 200, the displayed views are stored for later use, for example for use during manufacturing processes, such as repairing or maintaining steps to IB be performed on the target object. Storing the displayed view may comprise storing metadata corresponding to the displayed view. The metadata may comprise camera parameters of the physical or the virtual camera of the AR device, such as position, rotation, orientation or intrinsic parameters. As mentioned above, the metadata may further comprise the visibility, e.g. a visibility matrix, as well as a maintaining or repairing status of the target object. In particular, the metadata may comprise position and/or orientation of the target object and/or a virtual object within the displayed view. The metadata may further comprise information of, or references to the above described sequence of steps, i.e. an execution scenario. The metadata may further comprise information of, or references to the target object, for example, 3D-model information of the target object.

When a previously stored displayed view is shown on the display of the AR device, the stored metadata is used to adequately superimpose corresponding virtual objects on the displayed view. In other words, the camera parameters of the virtual camera are adjusted according to the parameters of the physical camera corresponding to the displayed view. In particular, the virtual camera may take on the parameters of the physical camera at the time of capturing the image data corresponding to the displayed view, the parameters of the physical camera being stored as metadata.

Thus, by comparing visibility thresholds with corresponding visibility values, the AR device is enabled to (automatically) store displayed views that are suitable for assisting a user in performing (a sequence of) specific repairing or maintaining steps. In that manner, previously stored displayed views may be displayed to the user when the repairing or maintaining steps are actually performed, thereby providing optimal assistance to the user. Moreover, the AR device is enabled to capture and store only relevant displayed views, i.e. to avoid storing displayed views that are unnecessary for a specific task to be performed (e.g. displayed views not showing a specific part of the target object), thereby ensuring an efficient use of AR device resources, such as processing, storage or energy resources.

Figure 3:
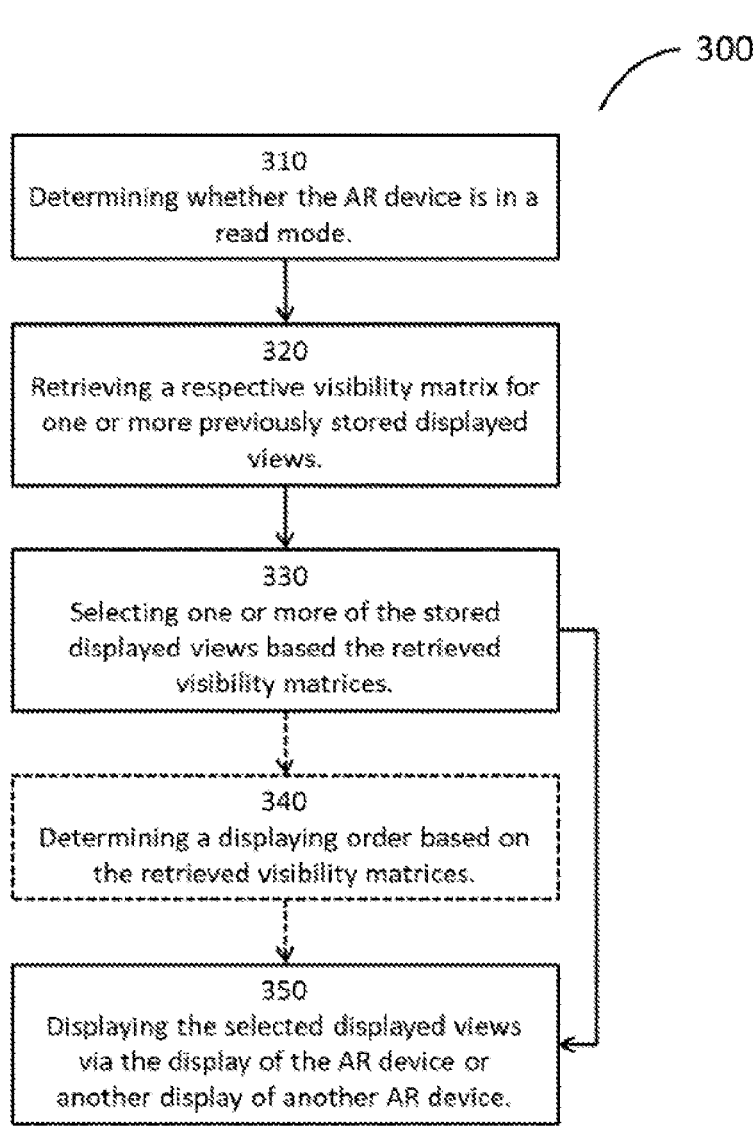
FIG. 3 shows a flowchart of a second computer implemented method.

FIG. 3 shows a flowchart of a second method 300 comprising, inter alia, the step of displaying displayed views that have been previously stored as described above. In a first step 310, it is determined whether the AR devices in a read mode. A read mode may be entered by the user by selecting the read mode from a plurality of modes comprising the read mode and a preview mode. The read mode may also be entered based on the determination that the orientation of the AR device is in a read mode position. The read mode position may be a substantially horizontal position, i.e. when the orientation of the AR device is in a horizontal position, e.g. when the AR device is orientated parallel to the floor. A substantially horizontal position may still be considered a horizontal position if the orientation of the AR device deviates from the horizontal position by about 5°, 10° or 15°.

Determining that the orientation of the AR device is in a read mode position may further be based on sensor data indicating the relative position and/or orientation of the AR device and the target object. In that manner, the user of the AR device is enabled to capture image data while holding the AR device in a substantially horizontal position, for example, when capturing image data of a top view of the target object. Additionally, or alternatively, the determination that the AR devices is in a read mode position may be based on the determination that the target object is not present within the displayed view, e.g. if the visibility of the displayed view is below a certain threshold, and/or that the target object cannot be tracked within the displayed view. Additionally, or alternatively, the determination that the AR devices in a read mode position may be based on sensor data, such as data received from an accelerometer, in order to determine whether the AR device has been put in a (fixed) read mode position.

In response to determining that the orientation is in the read mode position, one or more (most) suitable displayed views are displayed. Said most suitable displayed views are determined by method steps 320 and 330. In step 320, a respective set of metadata of one or more previously stored displayed views are retrieved. The retrieved metadata comprises respective visibility matrices of the storage displayed views.

Based on the retrieved metadata, one or more of the stored displayed views are selected in step 330 as most suitable displayed views. The selected displayed views may have visibility values or visibility matrices indicating a highest visibility of the target object among the storage displayed views, e.g. if specific visibility values of the visibility matrix or a visibility matrix norm exceed respective thresholds. The selected displayed views may further be assigned to a repairing or maintaining process or a sequence of repairing or maintaining processes. Alternatively, the one or more stored displayed views may be manually selected by the user. Additionally, or alternatively, the one or more stored displayed views may be selected based on user input, the user input corresponding to metadata stored with the display view. For example, the user may indicate, via user input, which task is to be performed on which target object. The AR device may then display adequate image data based on visibility values corresponding to the respective step or sequence of steps and target object information.

In step 340, a displaying order is determined based on the retrieved visibility matrices of the selected displayed views. The visibility matrices may be indicative of a relative position and/or orientation of the AR device and the target object within the displayed view. For some repairing or maintaining tasks the AR device may best assist the user by displaying the target object from different viewing angles. Furthermore, the selected displayed views may correspond to a sequence of maintaining or repairing steps that are to be successively performed. It may thus best assist the user of the AR device to display the selected displayed views in an order corresponding to the order in which the successive steps are to be performed, rather than in the order in which the selected displayed views have been captured and/or stored. Alternatively, the user may manually select a displaying order.

In step 350, the selected one or more stored displayed views are displayed via the display of the AR device, either simultaneously or subsequently or a combination thereof, in particular according to the displaying order determined in step 340. In addition to displaying the selected displayed views, a current view of currently captured image data may also be displayed in order to enable the user of the AR device to compare the current live view with the selected displayed views, i.e. screenshots. A screenshot may be defined as a stored displayed view.

In that manner, simultaneously displayed screenshots of a single target object may comprise displayed views showing the target object from different angles or positions. Successively displayed screenshots may likewise be selected based on visibility values indicating the position and/or orientation of the target object and/or the virtual object within the respective screenshots. Thereby, a successively displayed screenshot may show the target object from a different angle or from a different perspective compared to a previously displayed screenshot, wherein the change in angle or perspective may be based on a user input. The user input may be a gesture control, such as a swipe gesture performed by the user.

As pointed out above, the position and/orientation of the virtual objects superimposed on the display screen may depend on the position and/orientation of the target object within the display screen. Thus, when different screenshots are simultaneously or successively displayed, the position and/or orientation of a virtual object superimposed on a first screenshot of the different screenshots is accordingly adjusted when superimposed on a second screenshot of the different screenshots.

Figure 4:
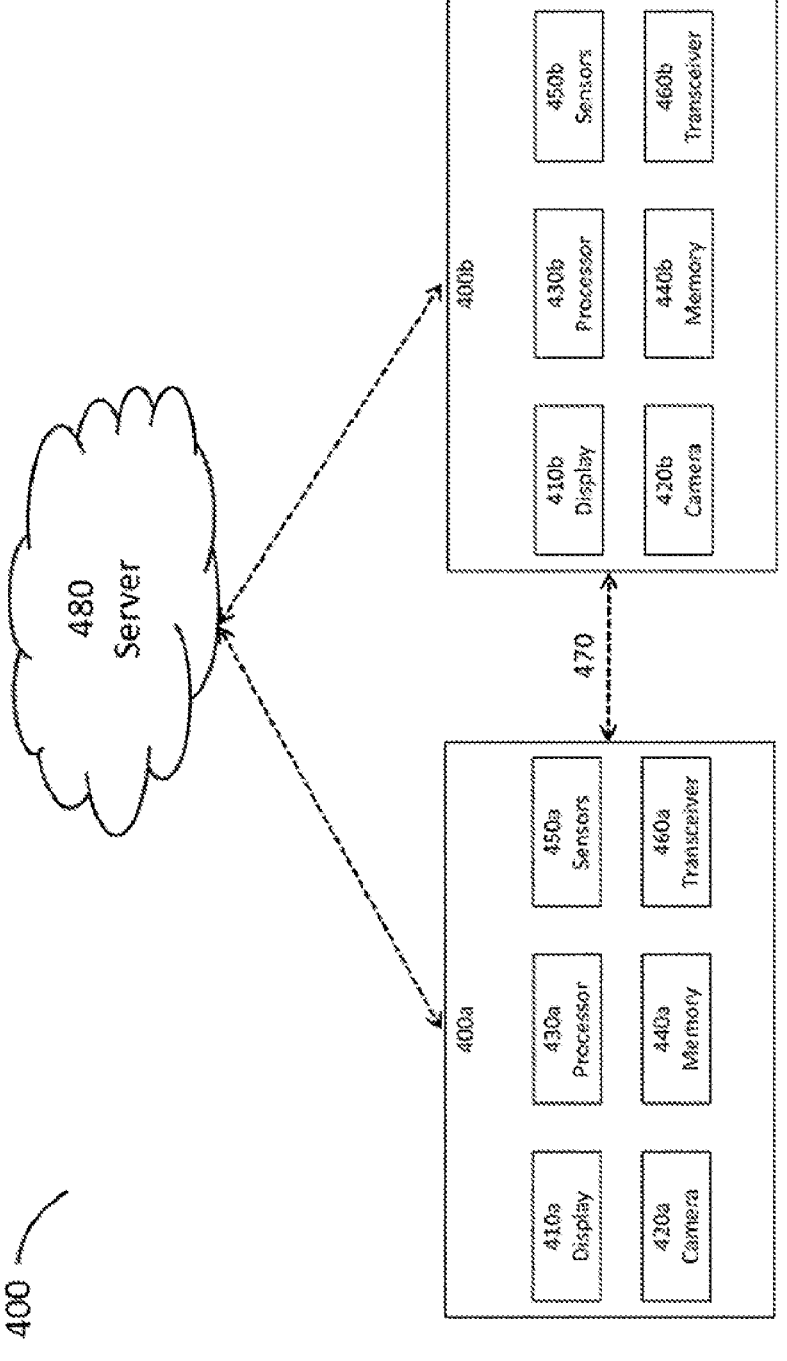
FIG. 4 shows a system comprising a first AR device and a second AR device comprising means for carrying out methods according to the present invention.

FIG. 4 shows a system 400 comprising a first AR device 400*a* and a second AR device 400*b*, both AR devices being similar to AR device 100 described with reference to FIG. 1. AR devices 400*a* and 400*b* may comprise more or fewer modules than AR device 100. Both AR devices are configured to communicate with each other using transceiver 460*a* and transceiver 460*b*, respectively. The communication may be established directly by transceivers 460*a* and 460*b* and/or via a server 480 comprised by system 400.

The displayed view captured and stored by the first AR device 400*a* may be stored either in memory 440*a* or at the server 480. From memory 440*a* or from the server 480, the stored displayed views may be communicated to the second AR device 400*b*. The displayed view may then be selected and displayed via the display of the second AR device 400*b*, as described with reference to FIG. 3.

In that manner, users of a plurality of AR devices are enabled to receive and display augmented displayed views stored by one of the AR devices. Using the metadata stored together with the displayed views, each of the AR devices is further enabled to interact with the displayed views, e.g. by changing virtual information superimposed on the displayed view.

Referring now to FIG. 5, in which a flowchart of a third method 500 is shown. The method steps 510 to 540 correspond to the method steps 210 and 240 described with reference to FIG. 2. In step 550, a second view of the image data obtained by the camera of a first AR device (the AR device specified in method step 510) is displayed via a display of another, i.e. a second AR device. For example, a user of the first AR device may seek remote support from a user of the second AR device whilst performing manufacturing tasks, such as repairing or maintaining tasks with respect to a target object.

In step 540, a trigger signal is generated based on the visibility of the tracked target object. The trigger signal may be generated when a target object can be tracked, i.e. when the target object is visible within the view of image data displayed on the screen of the second AR device. The trigger signal may trigger a masking of the target object or a displaying of only the target object, as defined in method steps 560 and 570, respectively. Additionally, or alternatively, the image data corresponding to confidential objects or areas may be selected by a user via user input on the AR device.

According to an example, the target object may be situated in a working environment, the working environment comprising confidential information or objects. That is to say that, on the one hand, the target object needs to be displayed on the display of the second AR device in order to enable the user of the second AR device to support the manufacturing steps to be performed on the target object.

On the other hand, the user of the first AR device may wish to prevent objects or information other than the target object from being presented to the user of the second AR device. To do so, only the tracked target object is displayed on the display of the second AR device in step 570. In other words, only image data corresponding to the target object is displayed via the display of the second AR device, whilst other image data is either not displayed and/or not received by the second AR device, or modified such that displayed view of the modified image data does not disclose the objects or information surrounding the target object within the working environment. Modifying image data or the displayed view of the image data may comprise blurring at least parts of the image data or the corresponding displayed view.

Additionally, or alternatively, at least parts of the image data not corresponding to the target object may be masked or hidden by virtual objects superimposed on the view of the image data displayed via the display of the second AR device. The position of said virtual objects may depend on the position of the target object within the displayed view, such that the confidential image data is prevented from being disclosed to the user of the second AR device. Positioning said virtual objects may comprise identifying, based for example sensor data or previously received model information, non-confidential image data not corresponding to the target object, such as walls or other known objects within the working environment.

Alternatively, a confidential object within the working environment may be defined as the target object. For example, the user of the first AR device may wish to present the working environment to the user of the second AR device without presenting the confidential target object. In this case, the confidential image data corresponding to the target may not be displayed and/or not received by the second AR device. Additionally, or alternatively, the confidential image data may be encrypted or modified as described above, such that the confidential target object is not disclosed to the user of the second AR device. Similar to what is described above, a virtual object may be superimposed on the view of the image data displayed by the second AR device, such that the target object is hidden behind the virtual object. In other words, as defined in method step 560, the target object displayed via a display of a second AR device is masked.

FIG. 6 shows a flowchart of a fourth computer implemented method 600. The method steps 610 to 640 correspond to the method steps 210 to 240 described with reference to FIG. 2. The trigger signal generated in step 640 is configured to provide an indication to point the user of the AR device in a certain direction or to indicate a target position of the AR device.

According to an example, the user may be pointed in a certain direction in order to ensure that displayed views being (most) suitable for assisting a user in performing specific repairing or maintaining steps can be captured and/or stored. Additionally, or alternatively, a target position for the AR device is indicated to the user. In that manner, the user is prompted to move to the target position. The target position is a predetermined or estimated position that corresponds to a relative position and/or angle between the AR device and the target object that allow the AR device to capture image data, a displayed view of which is expected to represent a relevant displayed view.

According to another example, it may be determined, based on the visibility of a target object corresponding to a currently displayed view of captured image data, that the user of the AR device is positioned in a danger zone. The danger zone may be defined relative to the position and/or orientation of the target object. Thus, if the user of the AR device comes too close to a target object or moves too far away from a target object, in particular from or in a certain direction, a warning signal may be provided to the user. The warning signal may comprise visual or acoustic signals. Visual signals may comprise virtual objects superimposed on the display screen. Additionally, or alternatively, the danger zones may be (pre)defined, in particular via user input on the display of the AR device.

Furthermore, the determination whether the user of the AR device is positioned in a danger zone may depend on data retrieved from sensors of the AR device or received via a transceiver the AR device. In an example, an area in which the user of the AR device is currently positioned may be defined as a danger zone based on data indicating the approach of an obstacle or dangerous object. Hence, the definition of a danger zone may be time-dependent.

If a determination is made that the AR device, i.e. a user of the AR device is positioned in a danger zone, an indication may be sent to another device via a transceiver of the AR device. In particular, the indication may be sent to a device or object based on the position and/or orientation of which the danger zone is defined. In that manner, a collision with, for example, an approaching dangerous object may be prevented.

In addition to determining whether a user of the AR device is positioned within a danger zone, it may be determined whether the user may leave the danger zone (in time). That determination may be based on sensor data of the AR device. For example, data of an accelerometer of the AR device may be indicative of unusual user movements due to shocks or collisions of the user within the danger zone.

The invention claimed is:

1. A computer implemented method comprising:
   displaying, via a display of an augmented reality (AR) device, views of image data obtained by a camera of the AR device as the AR device is moved by a user;
   tracking a position of a target object within the displayed views;
   determining a visibility of at least one of: i. the tracked target object and ii. a virtual object to be superimposed on the tracked target object on the display, wherein the position of the virtual object is dependent on the position of the target object;
   for each view of a plurality of the displayed views, storing, in response to generation of a trigger signal, the each view in association with a respective visibility matrix comprising at least one visibility matrix element indicative of visibility of the target object within the each view;
   retrieving a respective visibility matrix for a plurality of the stored displayed views;

selecting a plurality of the stored displayed views based on the retrieved visibility matrices;
   determining a displaying order of the selected views based on the retrieved visibility matrices; and
   displaying the selected views via the display of the AR device simultaneously or successively in the determined order.

2. The method of claim 1, wherein the displaying the selected views via the display of the AR device is performed in response to determining that the AR device is in a read mode.

3. The method of claim 1, wherein the trigger signal is generated depending on the visibility.

4. The method of claim 3, further comprising:
   displaying a second view of the image data obtained by the camera of the AR device via a display of another AR device;
   wherein, within the displayed second view, the trigger signal triggers either a masking of the target object or a displaying of only the target object.

5. The method of claim 3, wherein the trigger signal triggers a storing of the displayed view.

6. The method of claim 3, wherein the trigger signal is configured to provide an indication to a user of the AR device to enable the user to store the displayed view.

7. The method of claim 3, wherein determining the visibility comprises at least one of: i. determining an image quality of the displayed view; and ii. determining whether at least a portion of the target object is visible within the displayed view; and, iii. determining whether at least a portion of the virtual object is visible within the displayed view.

8. The method of claim 3, wherein the visibility is determined based on sensor data indicative of at least one of position and motion of the target object.

9. The method of claim 3, wherein the visibility is determined based on sensor data indicative of at least one of position and motion of the AR device.

10. The method of claim 3, wherein the visibility is determined based on the tracked position of the target object.

11. The method of claim 3, wherein generating the trigger signal further comprises comparing the visibility of the displayed view with a previously determined visibility of a corresponding previously displayed view or previously stored displayed view.

12. The method of claim 3, wherein the tracking of the position of the target object is based on previously obtained target object information.

13. The method of claim 3, wherein the trigger signal is configured to provide an indication to point a user of the AR device in a certain direction.

14. The method of claim 3, wherein the trigger signal is configured to indicate a target position for the AR device.

15. A computer-readable storage medium comprising instructions which, when executed by an augmented reality device, causes the augmented reality device to carry out the method of claim 1.

16. The method of claim 2, wherein the read mode has been triggered by the AR device being placed in a substantially horizontal position.

17. The method of claim 2, wherein the read mode has been triggered by the user selecting the read mode from a plurality of modes comprising the read mode and a preview mode.

* * * * *